(No Model.)

DE WITT C. YORK.
ANIMAL STALL.

No. 457,806. Patented Aug. 18, 1891.

Witnesses
A. Keithley
H. W. Wells

Inventor.
DeWitt C. York
By L. M. Thurlow
Atty.

UNITED STATES PATENT OFFICE.

DE WITT C. YORK, OF EL PASO, ILLINOIS.

ANIMAL-STALL.

SPECIFICATION forming part of Letters Patent No. 457,806, dated August 18, 1891.

Application filed December 4, 1890. Serial No. 373,576. (No model.)

*To all whom it may concern:*

Be it known that I, DE WITT C. YORK, a citizen of the United States, residing at El Paso, in the county of Woodford and State of Illinois, have invented certain new and useful Improvements in Animal-Stalls; and I do declare the following to be a full, clear, and exact description of the invention, such as will enable others skilled in the art to which it appertains to make and use the same, reference being had to the accompanying drawings and to the letters of reference marked thereon, which form a part of this specification.

This invention relates to improvements in animal-stalls.

The object of the invention is to provide means whereby the stall and the animal may be kept clean and free from dirt.

Figure 1:
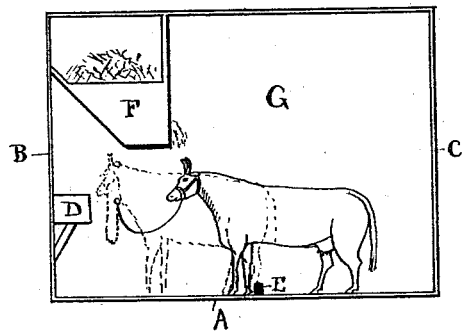
Figure 2:
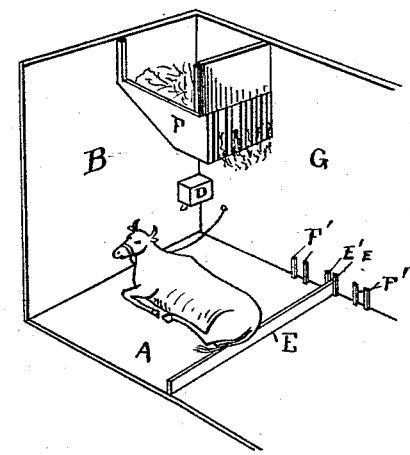
Figure 3:
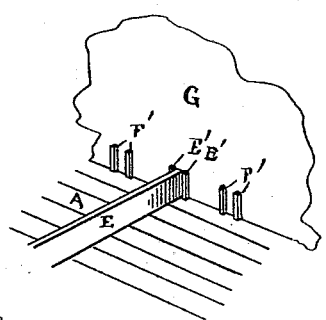

In the accompanying drawings, Figure 1 represents a side view of the stall with one side partition removed to show the interior of the stall. Fig. 2 represents a perspective view of the stall, showing the interior arrangements. Fig. 3 is a perspective view of a beam and cleats used in the invention.

A, B, and C represent the floor, and front and rear walls of the stall, respectively, and G represents one of the side partitions.

D represents a feed-box ordinarily used, and F is a hay-rack for the use of the animal, and which is built from the ceiling, and which sets out into the stall from the front wall, so that the animal in order to eat therefrom must step backward over a bar or beam E, placed on the floor. The said bar E is held in place on the floor by cleats E' E,, fastened against the side partitions, as shown in Figs. 2 and 3. The floor of the stall forward of this bar E may be built on a level or slanting, as desired; but the floor immediately behind the said bar E is built, preferably, in a sloping position, so as to drain the stall of all moisture, &c. The object of this construction is that when the animal eats from the hay-rack or feed-box it must step over the bar E and move backward, so that any and all droppings may be allowed to fall behind the bar E outside of the stall proper. It is also intended that whether the animal is eating or whether it is standing close up to the front wall its rump is always behind the bar E. When in the position of eating, the bar E is brought just behind the fore legs of the animal, and when eating from the feed-box, which is designed to be brought forward, the animal's rump will occupy the same relative position as before. When the animal occupies a reclining position, it will not lie on the bar E, on account of the extreme inconvenience, so that it takes up a position between the front wall and said bar E, as shown in Fig. 2. The bar E is adjustable to the length of the animal placed in the stall, so that the rump rests upon the said bar, and by this means the droppings are again allowed to fall outside of the stall proper.

This improvement has been used for some time and is found to give perfect satisfaction.

I claim—

In combination with an animal-stall having feeding devices in one end, a bar E, placed on the floor of the stall, said bar E being adjustable to lengthen or shorten the stall, and held in place by cleats E' E' and F' F', said bar E being so placed that when the animal is in a reclining position its rump rests upon said bar E, in the manner and for the purposes herein set forth and described.

In testimony whereof I affix my signature in presence of two witnesses.

DE WITT C. YORK.

Witnesses:
SAM T. CURTISS,
W. H. FERGUSON.